Feb. 26, 1946. D. E. MARSH 2,395,563
REMOTE-OPERATING CONTROL DEVICE
Filed Oct. 3, 1942 5 Sheets-Sheet 1
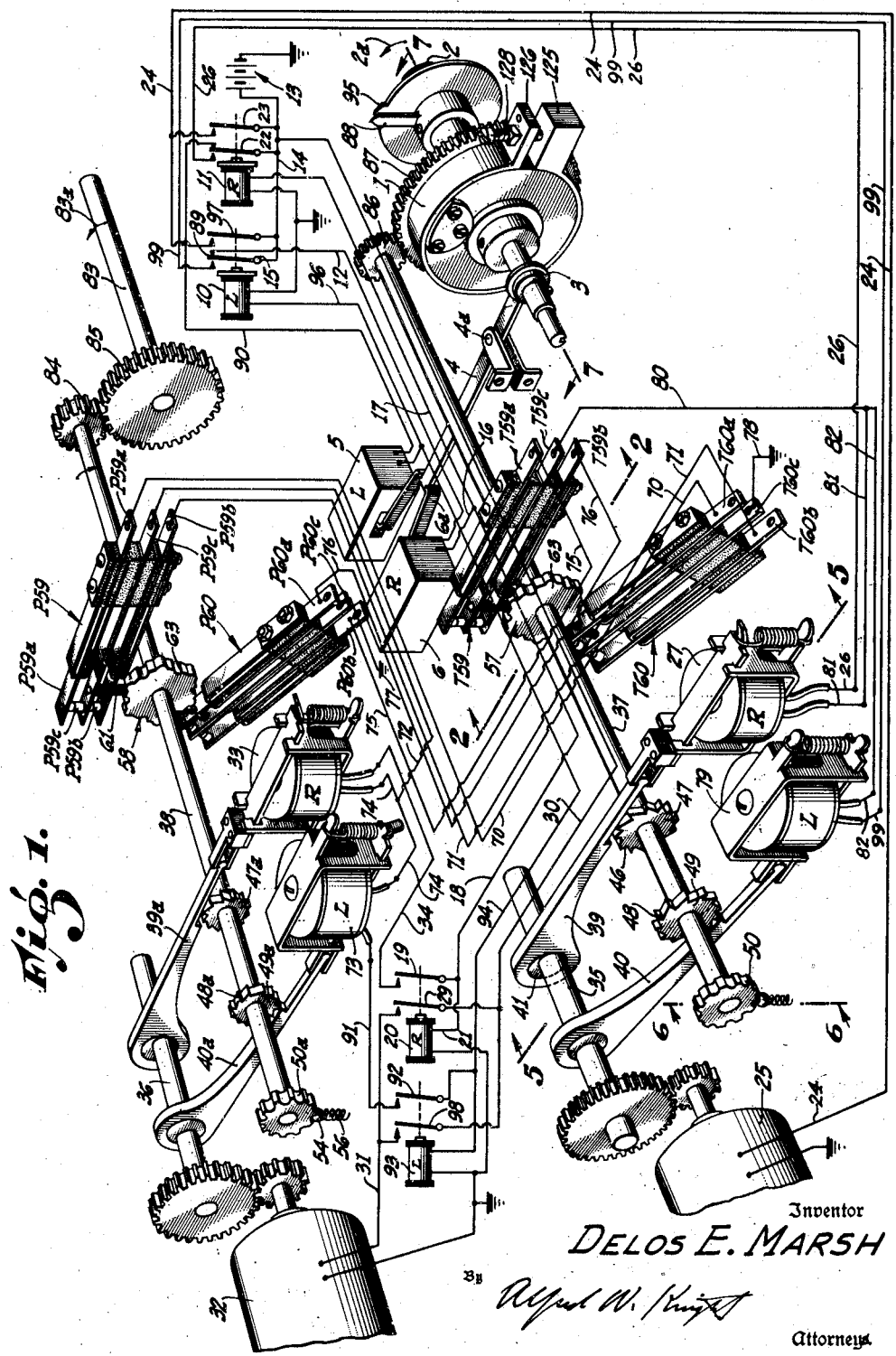
Inventor
DELOS E. MARSH
By Alfred W. Knight
Attorneys

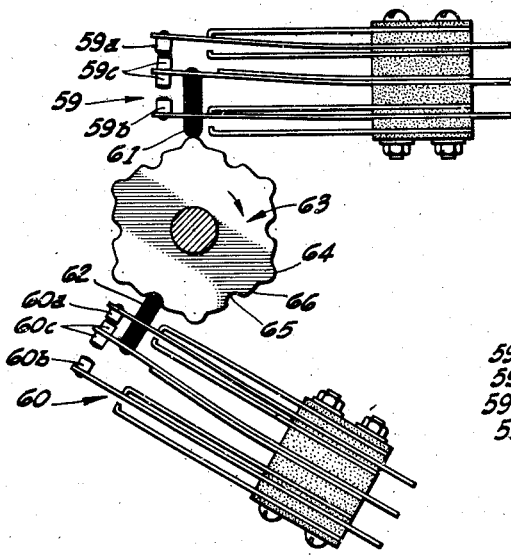
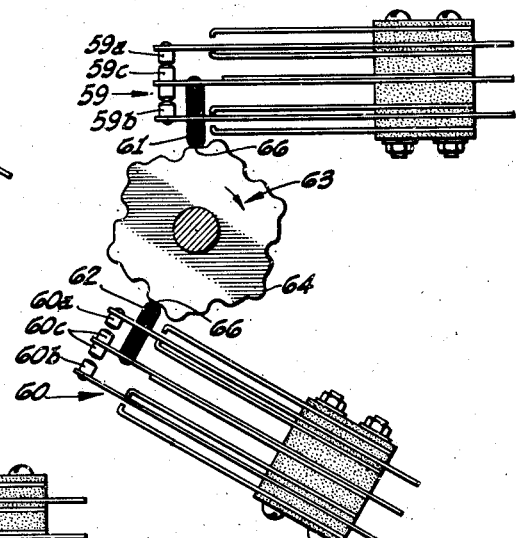
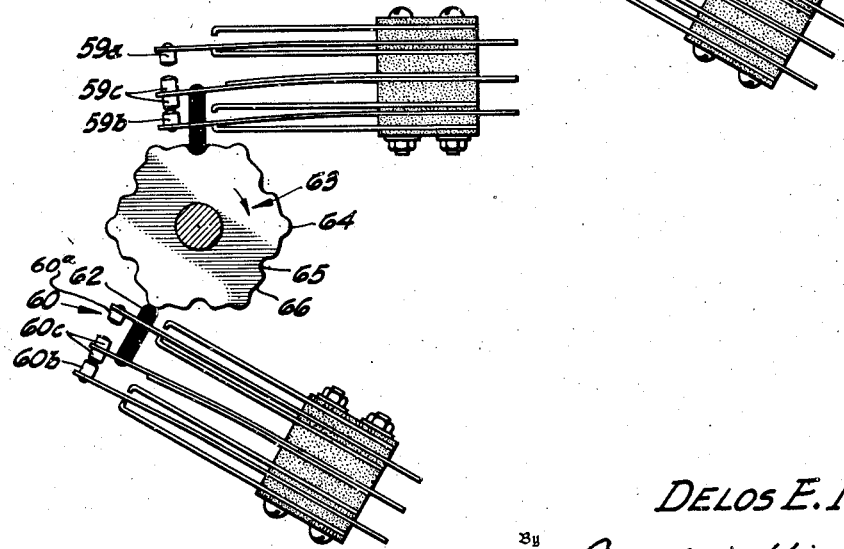

Feb. 26, 1946. D. E. MARSH 2,395,563
REMOTE-OPERATING CONTROL DEVICE
Filed Oct. 3, 1942 5 Sheets-Sheet 3
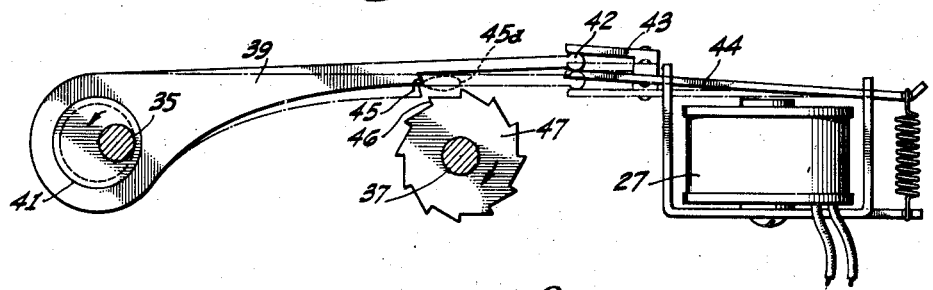
Inventor
DELOS E. MARSH
By
Attorneys.

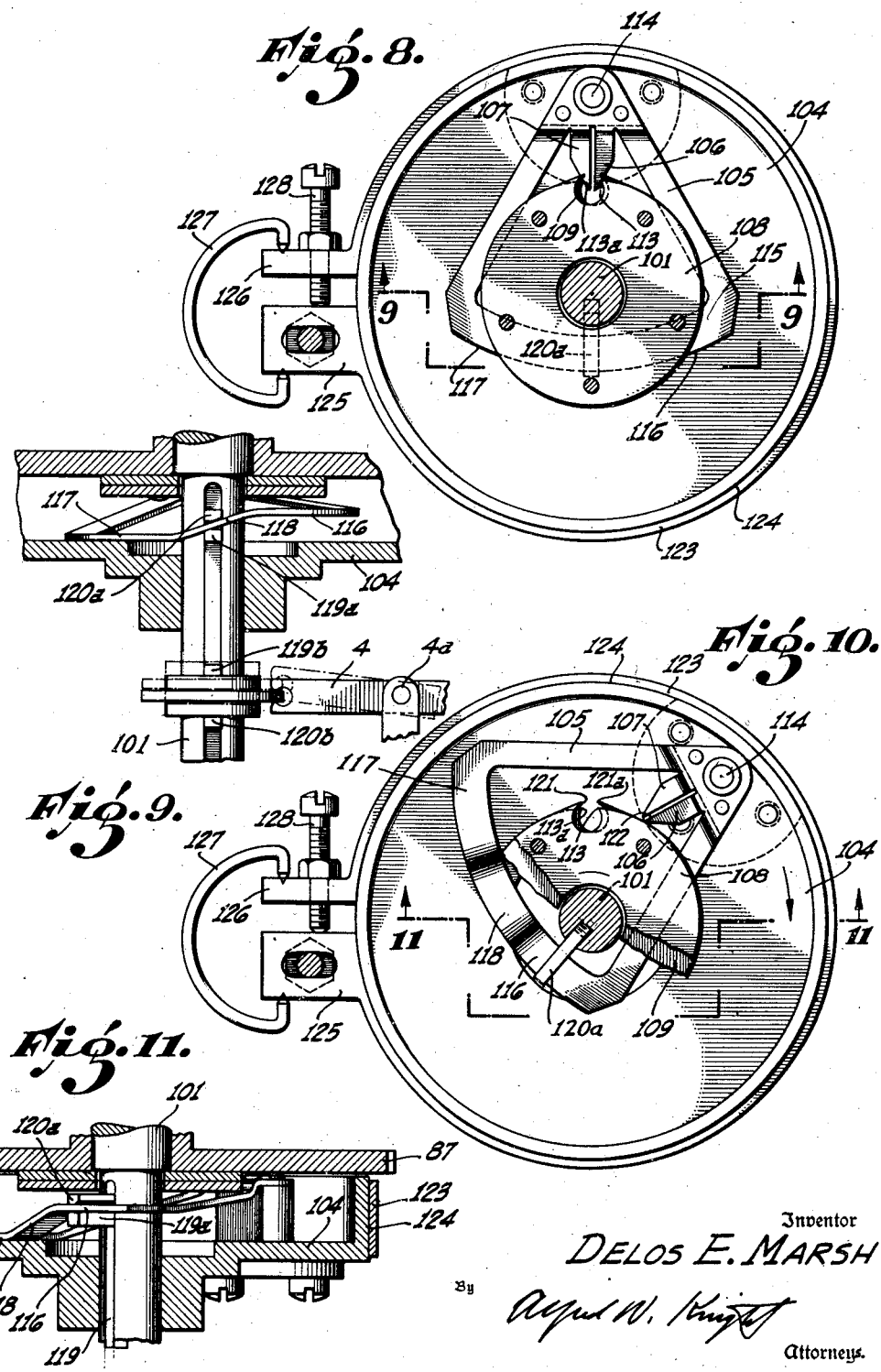

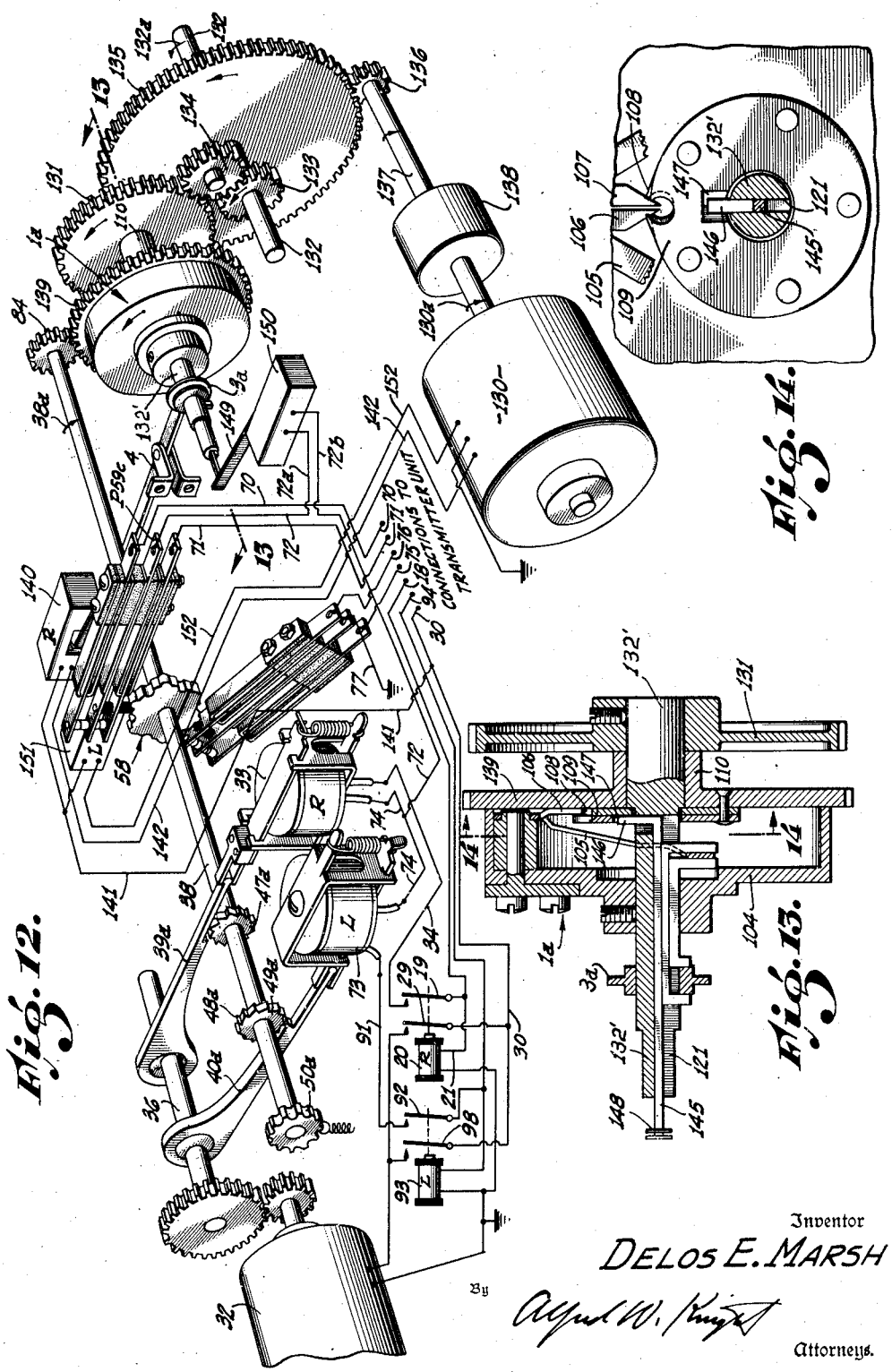

Patented Feb. 26, 1946

2,395,563

UNITED STATES PATENT OFFICE 2,395,563

REMOTE-OPERATING CONTROL DEVICE

Delos E. Marsh, Los Angeles, Calif., assignor to Richard R. Stoddart, Los Angeles, Calif.

Application October 3, 1942, Serial No. 460,699

21 Claims. (Cl. 177—334)

This invention relates to electro-mechanical remote control devices, and pertains particularly to a remote-operating control device adapted to cause a given amount of movement of an operated member at a position remote from the control point at which the movement is instituted, and to communicate to the control point information as to the degree of movement which has been effected in the operated member.

In a remote control system which is relied upon to impart a specific quantity and quality of movement to an operated member upon mere change of a control setting at the control position, it will be appreciated that two important features must be provided if the system is to be relied upon, i. e., the imparted movement must (1) be correct as to quantity and as to direction (quality), and (2) the extent and direction of the movement actually effected in the operated member must be communicated to the operator so that he will be apprized of the actual extent of movement which has been accomplished in the operated member. For the most part, those concerned with the art have hitherto accomplished these two objects by making the power or position-actuating means of a rather direct type, as through mechanical linkages, fluid or electrical motors or the like, and employing a separate "reference" mechanism such as a "Selsyn" assembly to indicate the position of the operated member to the operator.

According to my invention, the member which is used to impart the desired motion in or to the operated member is itself relied upon to communicate the extent and direction of the imparted motion to the operator, and, in addition, the device is so arranged that the desired motion is imparted as a result of a series of small incremental motions of the operating means, in which each increment of motion must be completed in the operated means and communicated to the control position before a successive increment of motion is effected, wherefore the operator is constantly apprized of the actual motion which has been imparted to the operated member.

One of the particular objects of the invention is to provide a remote-control operating means which is positive in operation, and which will continuously indicate to the operator the extent of movement of the operated member.

A further object of the invention is to provide an electro-mechanical remote-control operating means including a transmitter portion at which a desired remote movement is instituted and a power portion which effects such remote movement in response to the action of the transmitter portion, a further particular object in this connection being to provide a device of the character described in which the transmitter and power portions of the device are electrically connected and in which an interruption of the electrical circuit at any point as a result of failure will completely block the operation of the device as a whole, thereby eliminating any false operation or indication of operation.

A further object of the invention is to provide a device of the character described, in which two mechanically separate, electrically interconnected substantially similar reference units are provided, said units respectively functioning as the transmitter and the remote-drive power units, and in which the movement of each unit is of an incremental nature and the incremental movement of either unit is dependent upon and controlled by a prior incremental movement of the other unit, whereby both units are caused to remain in "step" throughout all movements of the device as a whole.

A further object of the invention is to provide a remote-operating control device adapted to produce a smooth flow of power at the operated member, wherein incremental movements of the transmitter and power units are employed for synchronization of the units as set forth immediately above and the incremental movement of the power unit under control of the transmitter unit is employed to control the smooth power flow which is imposed upon the operated member.

The device of the present invention may comprise, essentially, a control member adapted for manual operation by the person seeking the desired remote operation of an operated member, an incremental movement transmitting mechanism, and an incremental movement power mechanism, said control member being in electrical association with both said transmitting and power mechanisms, and the transmitting mechanism being in electrical control of the power mechanism through a switching mechanism adapted to energize said power mechanism upon operation of said control member and cause a single increment of motion in said power mechanism, and said power mechanism being in electrical control of the transmitting mechanism whereby upon said single increment of motion of said power mechanism the transmitting mechanism is caused to make a single increment of motion, together with indicating means associated with said control member and said transmitting mechanism and adapted to transmit an indication of such last-named incremental motion to a position adjacent said control member.

The accompanying drawings illustrate remote control devices in accordance with this invention, and referring thereto:

Fig. 1 is an isometric projection of one form of the device with the electrical circuit connections and certain other elements shown diagrammatically;

Fig. 2 is a sectional view on line 2—2 in Fig. 1 showing a preferred form of switching mechanism for controlling the operation of the transmitting and power mechanisms, with the parts shown in one position;

Figs. 3 and 4 are views similar to Fig. 2, with the parts shown in different positions in their sequence of operation;

Fig. 5 is a sectional view on line 5—5 in Fig. 1 showing an electromagnetically controlled pawl and ratchet mechanism used in the device;

Fig. 6 is a sectional view taken on line 6—6 in Fig. 1 showing a detent mechanism for positioning other elements of the device;

Fig. 7 is a sectional view on line 7—7 in Fig. 1 showing a preferred form of the control unit of the device;

Fig. 8 is a transverse vertical section on line 8—8 in Fig. 7;

Fig. 9 is an inverted horizontal section on line 9—9 in Fig. 8;

Fig. 10 is a view similar to Fig. 8 showing another position of the pawl and cam mechanism of the control unit.

Fig. 11 is an inverted horizontal section on line 11—11 in Fig. 10;

Fig. 12 is an isometric projection of the power unit portion of a modified remote control device according to the invention;

Fig. 13 is a vertical longitudinal section on line 13—13 in Fig. 12 showing the control unit of the power mechanism in this modified form of the device; and Fig. 14 is a transverse vertical section on line 14—14 in Fig. 13.

Referring to Fig. 1, the control unit or differential pawl and cam mechanism which is provided for the transmitter unit portion of the device is illustrated at 1. Under the control of the operator, rotation of a manual control knob 2 of the pawl and cam mechanism will cause an axial movement of a collar 3 (through mechanism which is hereinafter more particularly described in connection with Figs. 6 and 8 through 11), moving the switch arm 4 to cause operation of a left "micro-switch" 5 (marked "L") or right "micro-switch" 6 (marked "R"), dependent upon the direction of rotation of knob 2. Assuming that the direction of rotation of the knob 2 is clockwise (with respect to the operator's point of vision), the collar 3 will be pulled inwardly (away and to the right in Fig. 1), forcing the portion of the switch arm 4 beyond the pivot point 4a into engagement with the switch arm 6a of the switch 6. A pair of relays 10 and 11 are associated with the switches 5 and 6, each relay being provided with a single-pole double-throw and a single-pole single-throw switch assembly, and local battery power is supplied through line 12 to the switch 6 from a battery 13 through line 14 to the armature 15 of the double-throw switch portion of the relay 10, the armature 15 being adapted to make contact to the line 12 when the relay 10 is in unoperated or normal position. When switch 6 is closed, the line 16 is energized, and this line supplies local battery current to the coil of relay 11 through line 17, and also, through line 18, supplies local battery current to one of the armatures 19 of a double-pole single-throw relay 20 which is associated with the power unit portion of the device. The line 13 also supplies local battery current to the coil of relay 20 through line 21. Upon energization of relay 11, the two armatures 22 and 23 (both of which are connected to local battery line 14) are moved out of the normal or unoperated position shown in Fig. 1 and local battery current is thus supplied from the line 14 through line 24 to the transmitter mechanism drive motor 25 which operates the transmitter unit portion of the device, and local battery current is also supplied through line 26 to one side of the right reference electromagnet 27 of the transmitter unit. Upon energization of the relay 20, local battery current is supplied through armature 29 from a battery line 30 through line 31 directly to the power unit drive motor 32, and a separate battery supply from the line 18 is provided through armature 19 to one side of the right reference electromagnet 33 of the power unit portion of the device, through line 34.

The motors 25 and 32 are operatively associated with drive shafts 35 and 36, respectively, and these two drive shafts are rotated at all times during which a control operation is being carried out. Each of the drive shafts carries a pawl mechanism eccentrically mounted thereon which is adapted to engage ratchet means on a pair of switching shafts 37 and 38 in the transmitter unit and power unit portions of the device, respectively. The pawl mechanism mounted on the shaft 35 may comprise a right-reference pawl 39 and a left-reference pawl 40, the right-reference pawl being more particularly illustrated in Fig. 5 and it being understood that the left-reference pawl is of equivalent, but relatively reversed, construction. The pawl 39 is mounted on an eccentric 41 carried by the shaft 35, and is provided with an outer end portion 42 slidably mounted within a yoke 43 carried on the end of the armature 44 of the right-reference electromagnet 27. Upon energization of the coil of the electromagnet 27 the armature 44 will move to the dot-dash position of Fig. 5, bringing the pawl 39 and its detent member 45 into the dot-dash position. When moved to the dot-dash position the detent 45 will engage a tooth 46 of a ratchet member 47 which is fixed to the shaft 37, as a result of the rotation of shaft 35, rotating such shaft 37 through an angular movement corresponding to the spacing of the teeth 46. Twelve teeth are shown on the ratchet, by way of example, and the rotation produced in the ratchet by a single engagement of the detent 45 will be 30°. The path of movement of the detent 45 upon rotation of the eccentric 41 when in the full line position of Fig. 5 will correspond to the oval path indicated in dotted lines at 45a. The shape of the detent and the ratchet teeth 46 will be such as to cause the detent to remain in engagement with a ratchet tooth throughout a full movement of the detent 45 from left to right independent of whether the coil 27 remains energized throughout such stroke. The pawl 39a mounted on the shaft 36 may be similar in design and construction to the pawl 39. The pawls 40 and 40a are similarly constructed and are adapted to engage the teeth 48 and 48a of an opposite-hand ratchet 49 and 49a provided on the respective shafts 37 and 38 in order to effect rotation of the shafts 37 and 38 in the reverse direction to that provided by the pawls 39 and 39a. The shafts 37 and 38 are further preferably each provided with detent means adapted accurately to position the respective shafts in each one of the 30° successive increments of motion imparted by the ratchets, a suitable detent mechanism being indicated at 50 and 50a on the respective shafts. The detent mechanism is more particularly illustrated in Fig. 6, and may comprise a detent wheel 51 pinned or keyed to the shaft 52 (corresponding to the shaft 37 or 38) and provided with a plurality of notches 53 corresponding in spacing to the teeth of the ratchets 47, et cetera, and adapted to be engaged by a ball 54 carried in a sleeve 55 and biased toward the axis of the shaft 52 through the agency of a spring 56.

A switching mechanism which is adapted to control the operation of the left- and right-reference electromagnets is carried by each of the shafts 37 and 38, such switching mechanisms being indicated generally at 57 and 58, respectively. In Figs. 1 and 12 the switching mechanisms and their associated contact members are shown in an intermediate position (corresponding to Fig. 3), in order to simplify the representation, and as will be apparent from the ensuing specific description, it should be appreciated that the two switching mechanisms on the two shafts 37 and 38 could not be in this intermediate position at the same instant during normal operation of the device.

The switching mechanisms may each comprise two single-pole double-throw spring-leaf contact assemblies 59 and 60 (see Fig. 2). The contact assembly 59 may comprise an upper contact member 59a, a lower contact member 59b and an intermediate switching contact member 59c. Similarly, the contact assembly 60 may comprise an upper contact member 60a, a lower contact member 60b and an intermediate switching contact member 60c. The contact members 59c and 60c are actuated through the medium of stem members or actuating pins 61 and 62 which bear on the periphery of an actuating cam member 63 provided with alternating hill and vale cam portions 64 and 65 separated by a flat 66 and arranged in the same angular spacing as the ratchet teeth 46 of the ratchet 47. In order to equalize the forces on the actuating cam during operation, the contact members 59 and 60 are arranged so that when the pin 61 rests on a hill 64 the pin member 62 will rest in a vale 65 at the same time, and vice versa.

Upon rotation of the cam 63 through one increment of motion effected by movement of the ratchet wheel 47, the positions of the upper, lower, and intermediate switching contact members 59a, 59b and 59c, 60a, 60b and 60c will change in a manner and sequence corresponding to the showings in Figs. 2, 3, and 4. The contact assembly 59 for each of the shafts 37 and 38 functions as a "turn-off" switch member and the contact assembly 60 functions as a "turn-on" switch member, and for this purpose I so arrange the contact members that in the contact assembly 59 the three contacts 59a, 59b and 59c are in electrical contact when the pin 61 is on the flat portion 66 and so arrange the contact members 60a, 60b and 60c as to be out of electrical contact with each other when the pin 62 is on a flat portion 66. With the above arrangement of contacts and cams, when the cam is in the position shown in Fig. 2, contact is established between contacts 59a and 59c in the contact assembly 59, and electric contact is also made between contact members 60a and 60c in the contact assembly 60. When the cam 63 is rotated to the position shown in Fig. 3 contacts 59a and 59c remain in electrical contact, and the contact 59c is brought into electrical contact with contact 59b. In the contact assembly 60, the electrical contact between 60a and 60c is broken, and the contact member 60c is not yet moved into electrical engagement with the lower contact member 60b. When the increment of movement of the cam 63 is completed, as in Fig. 4, the contact between members 59a and 59c is broken, contact members 59c and 59b remain in engagement, and contacts 60c and 60b are interconnected.

In order to facilitate the description of the function of the contact assemblies, which assemblies may be identical on the two shafts 37 and 38 as above described, the same reference numerals will be used for both the transmitter unit portion of the device and the power unit portion of the device, the distinction between the two units being brought out in the description by a prefix "T" for the elements of the transmitter unit and the prefix "P" for the elements of the power unit, in each instance. Referring now to Fig. 1, it will be noted that contact P59a is electrically connected to contact T60a through line 70, contact P59b is electrically connected through line 71 to contact T60b, and contact P59c is electrically connected through line 72 to the return side connections 74 of the left- and right-reference electromagnets 73 and 33 of the power unit. Similarly, contact P60a is connected to contact T59b through line 76, contact P60b is connected to contact T59a through line 75, contacts P60c and T60c are connected to ground as at 77 and 78, and contact T59c is connected to the return side of the transmitter unit left- and right-reference electromagnets 79 and 27 through line 80 and branch leads 81 and 82, respectively.

Upon rotation of the knob 2 in a clockwise direction as indicated by the arrow 2a in Fig. 1, the right-reference micro-switch 6 will be closed as above described, starting the motors 25 and 32 and supplying current to the right-reference electromagnets 27 and 33 of both the transmitting and power unit portions of the device through leads 26 and 34, respectively. At this instant, the switching mechanisms 57 and 58 will be in the positions indicated in Fig. 2 or in Fig. 4. Assuming these switching mechanisms and their contact assemblies to be in the position indicated in Fig. 2, contacts P59a and P59c will be connected, which connects line 72 (the return side for the right-reference electromagnet 33) to contact T60a through line 70, thence to contact T60c to ground at 78. This completes the circuit for the right-reference electromagnet 33, engaging the pawl member 39a with the ratchet 47a and thus effecting one increment of movement of the cam member 63 of the switching mechanism 58. When the shaft 38 has been rotated, during this increment of movement, to a position such as shown in Fig. 3, it will be noted that contacts P59a and P59c remain in engagement maintaining the ground circuit through contact assembly T60 thereby maintaining the actuating position of the electromagnet 33. When the switching mechanism 58 has completed one increment of movement, the cam member 63 thereof having been moved to the position of Fig. 4, the return circuit for the electromagnet 33 is broken by separation of the contacts 59a and 59c. The contact assembly P59 therefore serves to turn off the right-reference motion of the shaft 38, and the driven shaft 83 will have been given one increment of movement in the same relative direction as the knob 2, as indicated by the arrow 83a, through the pinion 84 and spur gear 85.

Now that one increment of movement has been produced in the power unit portion of the device it is necessary to institute a corresponding increment of movement in the transmitter portion of the device so that the operator will be apprized of the fact that this movement has been effected. This is accomplished through the agency of the contact assemblies P60 and T59, in the following manner. Movement of the cam 63 of the switching mechanism 58 to the position of Fig. 4 closes the circuit between contacts P60b and P60c. Inasmuch as no movement has been effected upon the shaft 37 and its switching mechanisms, which are still in the position of Fig. 2, contacts T59a and T59c are in engagement, the contact T59c being connected to the right-reference electromagnet 27 of the transmitter unit through lines 80 and 81, and the interconnection of contacts P60b and P60c will through line 75 complete the return circuit for the electromagnet 27 to ground as at 77. This energizes the electromagnet 27, causing the pawl arm 39 to be depressed and engage the associated ratchet 47, rotating the cam 63 of the switching mechanism 57 to the position of Fig. 2. In this latter position the contacts T59a and T59c are interrupted, opening the circuit for the electromagnet 27, and stopping the operation of the shaft 37, the rotation of the shaft 37, carrying with it the pinion 86 meshed with a spur gear 87, causing an incremental movement of an indicating pointer 86 in the direction indicated by the arrow 2a. This movement indicates to the operator that the power unit portion of the device has completed one increment of motion. If the setting of the knob 2 were originally such that a single increment of movement of the shaft 37 would push the collar 3 outwardly and disconnect the right-reference micro-switch 6, the operation of the apparatus would thus be complete. The opening of the circuit at 6 deenergizes the relay 11, opening the battery circuit to the motors 25 and 32, and re-establishing battery connection through line 90 to one side of the left-reference micro-switch 5.

It will be noted that relays 10 and 11 are shown as being of a delay type so as to insure that battery will not be supplied to the left-reference micro-switch 5 or removed from the motor 25 before the units have had an opportunity to complete their motions. This delayed operation characteristic of the relays 10 and 11 is of particular importance in preventing the transmitter and power units from becoming de-synchronized, as will hereinafter be more fully described.

The completion of the above described single increment of motion of the shaft 37 and its associated switching mechanism 57 (into the position of Fig. 4) will place the contacts T59b and T59c and the contacts T60b and T60c in engagement. Similarly the contacts P59b and P59c are in engagement, as well as the contacts P60b and P60c. The switching mechanisms 57 and 58 are thus placed in a position such that the right- and left-reference electromagnets 33 and 73 of the power unit are connected to ground at 78 through leads 74, 72, contacts P59c and P59b, lead 71 and contacts T60b and T60c. Right- and left-reference electromagnets 27 and 79 in contrast, however, are not connected to ground at 77 through leads 81, 82, 80, contacts T59c, T59b, and line 76 for the reason that contacts P60a and P60c are broken. The result is that electromagnets of the power unit are connected so that energization of either the electromagnet 33 through lead 34 and armature 19 and lead 18 to the switch 6, or the electromagnet 73 through lead 91 to the armature 92 of the left-reference relay 93 of the power unit thence through lead 94 to micro-switch 5, will cause operation of the shaft 38 and its associated switching mechanism 58, but operation of the shaft 37 is prevented until an increment of movement has been effected in the shaft 38 and contacts P60a and P60c have been brought into engagement.

It may thus be seen that whenever an increment of movement is instituted by operation of the knob 2, the power unit portion of the device is first to operate and the increment of movement produced in the power unit causes a corresponding increment of movement to be effected in the transmitter unit portion. The power unit portion of the device is thus always the first one to operate and the transmitter unit portion is the last to operate. If the knob 2 had originally been rotated through a relatively large angle, the above described operation of the shaft 37 in response to the single increment of movement produced in the shaft 38 would not be sufficient to cause disconnection of the micro-switch 6, and in this situation, the right-reference relays 11 and 20 will remain energized, the motors 25 and 32 will remain in operation, and a new increment of motion in the shaft 38 and its associated mechanism will be instituted immediately upon closure of the circuit for the electromagnet 33 through the contacts T60b and T60c. This new increment of movement of the shaft 38 and its mechanism will again cause an increment of movement in the shaft 37 and its associated mechanism, the process being repeated until the transmitter control unit 1 is rotated to a point such that the pointer 86 is brought into alinement with the pointer 95 on the knob 2, at which time the micro-switch 6 will be opened and the operation interrupted. The operation of the device constitutes, therefore, a succession of incremental movements, first a movement on the part of the power unit, followed by a movement by the transmitting unit, then a second movement of the power unit, et cetera, the repetition being continued until the controlling micro-switch is de-energized.

It will be appreciated that rotation of the knob in a counterclockwise direction (from the operator's point of view) will effect a closure of the micro-switch 5 which is energized through line 90, energizing the left-reference relays 10 and 93 through leads 96 and 94, respectively, the relay 10 serving to energize the motor 25 by supplying battery from the armature 97 to the line 24 and the relay 93 supplying battery to the motor 32 through armature 98 which is connected to line 30 in the same manner as is the armature 29 of the relay 20. These operations of the relays 10 and 93 supply current to one side of the left-reference electromagnets 73 and 79 through leads 91 and 99 and armatures 92 and 89, respectively. This energization will cause operation of the switch mechanisms 57 and 58 in the same manner as above described, except that the shafts 37 and 38 will be rotated in the opposite direction, producing a corresponding opposite rotation of the shaft 83 and pointer 88 until registration of the pointers 88 and 95 is again established.

As brought out above, the left- and right-reference relays 10 and 11 which control the transmitter unit are so designed as to have a delayed release of the armatures upon deenergization of the relay coils, and it will be noted that the left- and right-reference relays 93 and 20 for the power unit are not of the delay type. The delay relays are employed at 10 and 11 in order to prevent the de-synchronization of the transmitter and power units. It will be appreciated that the operator might rotate the knob 2 of the control device 1 to the right a given amount, in order to cause movement of the operated member in a corresponding direction through the shaft 83, and then, before the reference mechanism had completed its operation to effect the full desired movement of the operated member the operator might change his mind and move the knob 2 in the reverse direction. Such a reverse movement might be either (1) to establish a setting corresponding to a degree of movement in the operated member less than that originally intended or (2) to establish a left-hand setting instead of a right-hand setting. In case (1) the differential pawl and cam mechanism in the housing 104 would merely be placed more closely in alinement, and the reference mechanism would cease operating earlier. In case (2) however, the knob 2 would rotate the cam members 108, 109 past the differential pawls 106, 107, momentarily placing the pawl and cam mechanism in the alined position of Fig. 8. If relays 10 and 11 were not of the delayed type, this would cause immediate deenergization of the right-reference electromagnets 27 and 33 through the opening of micro-switch 6, stopping the shafts 37 and 38 in whatever position they might have been in at that time and immediately starting a left-reference movement to be instituted. As above described, the pawl and ratchet mechanism 45—47 et cetera is so designed that once the pawl is engaged with a ratchet tooth by operation of the armature of the associated electromagnet, the pawl and ratchet tooth will remain in engagement throughout one increment of motion of the ratchet shaft, independent of the continued energization of the electromagnet. In the event that the transmitter unit had, at the moment of alinement of the differential pawl and cam mechanism, just completed an incremental movement and the power unit had not yet started to operate, no detriment would result. On the other hand, in the event that the power unit had just completed an increment of movement and the transmitter unit had not yet been moved its corresponding increment, the cessation of the operation of the device as a whole would cause the shafts 37 and 38 to be out of synchronization, particularly in view of the fact that the differential pawl and cam mechanism would not remain in the alined relation of Fig. 8, but would almost immediately be rotated into a position just the reverse of that of Fig. 10, immediately closing the left micro-switch 5. The result of this would be that the next movement of the device as a whole would be first a movement of the shaft 37 in a left-reference direction, placing it one complete increment out-of-phase with the shaft 38.

By the use of delayed relays at 10 and 11, taken with quick acting relays at 93 and 20, the above sequence of operations of the right and left micro-switches 6 and 5 would result in the shafts 37 and 38 being maintained in full synchronization. This results from the fact that the opening of the micro-switch 6 by the control arm 4 immediately disconnects (by opening the circuit to line 18) the right-reference electromagnet 33 of the power unit, but owing to the delayed action of the relay 11, the right-reference electromagnet 27 of the transmitter unit remains energized. In the event that the power unit had just started an increment of motion through operation of the electromagnet 33 and the differential pawl and cam mechanism were brought into the alined condition of Fig. 8, the initiated increment of movement of the shaft 38 would be completed by virtue of the mechanical engagement of the ratchet and pawl mechanism. The completed movement would place the switching mechanism 58 in condition to close the circuit for the electromagnet 27, effecting an increment of movement in the proper direction of the shaft 37. This last movement of the shaft 37 would place the switching mechanism 57 in condition such as to provide a return ground connection for the left- and right-reference electromagnets 73 and 33, but no operation therein would be effected owing to the fact that the relay 20 would be open, hence the right-hand movement of the transmitter and power units would stop with both units in their proper relation, i. e., the transmitter unit having been the last to operate. The delay in the relay 11 is therefore of such magnitude as to be in excess of the sum of the operating times of the transmitter and the power units, and is preferably sufficiently in excess thereof to insure completion of the operation of both units under load and at abnormally low temperatures such as would cause the mechanism to become sluggish. In view of the fact that the left microswitch 5 is energized only when the right-reference relay 11 is deenergized, it will be seen that no left-hand reference movement can be effected in the device until a prior right-reference movement has been completed and the right-reference relay 11 has assumed its normal or unoperated condition. It will be apparent that reverse sequence of operation as in changing from a left- to a right-reference movement will be equivalent to that above described, inasmuch as the right-reference micro-switch 6 would not be energized after a left-reference movement of the device until the relay 10 had assumed its normal or unoperated condition.

Referring now to Figs. 7 through 11, wherein I have illustrated the construction and operation of the transmitter control unit or differential pawl and cam mechanism indicated generally at 1 in Fig. 1, this control unit may comprise a shaft member 101 carrying the knob 2 and its pointer 95, the shaft being journaled at its inner end as at 102 within a supporting plate 103. Secured to the shaft 101 is a cam housing 104 carrying a pivotally mounted differential pawl member 105 provided with inwardly directed right and left actuating pawls 106 and 107. The pawls 106 and 107 are axially displaced and are adapted for respective engagement with a pair of right and left actuating cams 108 and 109 secured in axially spaced relation upon a hub member 110 to which the spur gear 87 is attached, said hub member being journaled in a forward end plate 111 as at 112 for support of the forward end of the unit 1, and carrying at its forward end the pointer 88.

Upon rotation of the knob 2 in a clockwise direction (corresponding to the arrow 2a in Fig. 1) the shaft 101 and the cam housing 104 will be rotated in a clockwise direction from the position shown in Fig. 8 to that shown in Fig. 10. As the housing 104 is rotated the actuating pawl 106 will be engaged by cam shoulder 113 of the cam 103, rotating the differential pawl member 105 clockwise about its pivotal axis defined by the pin 114. The differential pawl member 105 is shaped as a sector of a circle having its center at the pin 114 and is provided with an arcuate portion 115, the respective end portions of which are disposed in axially separated planes as indicated at 116 and 117 and the intermediate portion 118 of which is inclined into continuity with the portions 116 and 117. The arcuate portion 115 of the differential pawl member 105 thus becomes a cam which is employed to actuate the collar 3 and the lever arm 4 which controls the operation of the respective left- and right-reference micro-switches 5 and 6. Movement of the collar 3 is effected through the agency of push and pull rods 119 and 120 disposed in a longitudinal slot 121 in the shaft 101, the push rod 119 being provided with a lug 119a engaging the rearward face of the arcuate cam portion 115 of the member 105 and with a lug 119b engaging the forward face of the collar 3. The pull rod 120 is similarly provided with a lug 120a engaging the forward face of the arcuate cam portion 115 and a lug 120b engaging the rearward face of the collar 3. It will be understood that the lugs 119a and 120a will be so positioned with respect to the lugs 119b and 120b that when the first-named lugs are in engagement with the center of the inclined portion 118 of arcuate cam member 115, the collar 3 will be placed in an intermediate position such that neither the switch 5 nor the switch 6 will be closed (Fig. 9). Upon rotation of the knob 2 and housing 104 to the position of Fig. 10, moving the differential pawl member 105 to the position shown in Fig. 10, the lugs 119a and 120a will be moved forwardly to the position shown in Fig. 11 under the influence of the inclined portion 118 and the forwardly disposed end portion 116 of the member 105 (see dot-dash position of Fig. 9), which motion will be transmitted through the lever arm 4 to effect closure of the micro-switch 6 which starts the above described operation of the power unit and transmitter unit switching mechanisms. The movement of these mechanisms will produce the desired rotation of the shaft 83 and the spur gear 87, which gear will effect a rotation of the cams 108 and 109, and as the cam 108 is rotated clockwise as in Fig. 10 toward the position of the pawl 106, the opposed cam shoulder 121 of the cam 108 will engage the inner edge 122 of the pawl 106, rotating the member 105 counter-clockwise about the pivot 114 into the relative positions indicated in Fig. 8. The pawls 106 and 107 are so designed with respect to the operating cam shoulders 113, 113a, 121, and 121a of the respective cams 108 and 109 that the respective cam shoulders cooperate to engage the pawls 106 and 107, so that the outer edges of the pawls 106 and 107 are engaged substantially equally by the shoulders 113 and 113a, respectively, when the differential pawl member 105 is alined with the cams 108 and 109 as in the position of Fig. 8, which position of alinement corresponds to an alinement of the pointers 95 and 88.

It will be appreciated that there will be some mechanical drag on the pawls 106 and 107 by the respective cam members 108 and 109 as the cam members are rotated toward the position corresponding to the setting of the knob 2 as a result of the rotation of the spur gear 87 through the operation of the transmitter reference structure, and in order to prevent this drag from advancing the knob 2 to an undesired position, I preferably provide a braking means imposing a drag on the housing 104 somewhat in excess of the drag of the cams 108 and 109 on the pawls 106 and 107. For this purpose I may provide a brake shoe or band 123 engaging the outer peripheral surface 124 of the housing 104, one end of the band 123 being secured to the frame portion of the device as at 125 and the other end 126 of the band 123 being spring biased towards the fixed end 125 through the agency of a spring member 127, a suitable adjustment means being provided as at 128 to establish the desired frictional drag between the band 123 and the drum surface 124 of the housing 104.

It will be appreciated that the device provides a positive indication, at the operator's position, of the actual extent of movement which has been effected in the operated member driven by the shaft 83. The desired movement of the operated member is initiated under the control of the operator, by rotation of knob 2 to the corresponding position at either side of its previous position. The pointer or first index member 95 carried by said knob is thereby moved out of alinement with, and to one side or the other of, the pointer or second index member 88, thus showing the direction and extent of the desired movement. The second index member 88 is then moved in synchronism with the successive incremental movements of the transmitter unit, thus indicating completion of corresponding incremental movements of the power unit and its associated operated member, until the two index members are again in alinement which indicates that the desired movement has been effected. This provides the operator with a continuous indication of the incremental movements of the operated member toward and to the desired position corresponding to the setting of the first index member. In the event that the operated member is for some reason incapable of movement, the shaft 38 is prevented from rotating, wherefore no actuating connection is provided to the switching mechanism 57, and the indicating pointer 88 will not be brought into alinement with the pointer 95. Similarly, should any of the elements of the device fail to operate, as a result, for example, of an open circuit caused by a break in any of the wires, the position of the operated member at the instant of failure will be indicated by the position of the indicating pointer 88. It will further be appreciated that, in aircraft installation, as an example of a possible use of the device of this invention, it would be desirable to interconnect the various "grounded" portions of the construction throughout the aircraft structure, all in accordance with good electrical practice. In order to simplify the showing in the drawings the interconnection of these electrical grounds has been omitted.

The above described apparatus is adapted to produce an incremental type of rotary movement at the shaft 83, and the amount of power that can be transmitted to this shaft will be dependent upon the power of the motor 32. In the event that the device is intended to be used in connection with an operated member requiring either relatively high torque or a comparatively smooth delivery of power, I preferably employ a separate motor driven mechanism operating directly upon the drive shaft corresponding to the shaft 83, and use the power unit portion of the device to control the operation of this separate drive motor. In Figs. 12 through 14 I have illustrated this modification of the invention and referring thereto the complete power unit portion of the device is shown, including right- and left-reference electromagnets 33 and 73, the reference drive motor 32, and switching mechanism 58. It will be appreciated that the connecting leads or lines 70, 71, 75, 76, 18, 94 and 30 of Fig. 1 may be arranged in a cable and substantially any desired physical separation of the transmitter unit and power units of Fig. 1 may be established. For this reason the above-mentioned connecting leads are shown in Fig. 12 in position to be carried by cable or the like to the transmitter unit which is not shown. The transmitter unit for the arrangement shown in Fig. 12 may be exactly that of the showing in Fig. 1, and may be similarly provided with a control unit as described above. In order to cause the reference shaft 38 of the power unit to control a main power drive motor 130, I may provide another control unit 1a for the power unit which corresponds somewhat in function to the transmitter control unit 1 of Fig. 1. Except as noted below the parts of control unit 1a are numbered the same as in the above described control 1. The control unit 1a is provided with a spur gear 131 mounted on a shaft 132' which corresponds to the shaft 101 of Fig. 7, the spur gear 131 being driven from the main power delivery shaft 132 through a pinion 133 and an idler 134. The shaft 132 is provided with a drive gear 135 meshing with a pinion 136 mounted on the power motor shaft 137, which shaft is connected to the drive motor 130 through the agency of a magnetic clutch indicated at 138.

Upon rotation of the knob 2 (Fig. 1) in the direction of the arrow 2a, the power unit will be energized to effect rotation of the reference shaft 38 in the direction of the arrow 38a through operation of the relay 20, motor 32 and right-reference electromagnet 33 as above described. The corresponding rotation of the pinion 84 which meshes with a spur gear 139 on the hub portion 110 of the control unit 1a in Fig. 12 (the spur gear 139 corresponding in placement and function to the gear 87 of Fig. 1) will produce a relative rotation between said hub portion and the housing 104 and cause operation of the internal differential pawl and cam mechanism 105—109 equivalent to a left-hand rotation of the knob 2 (Figs. 7-11) causing a left-hand movement of the collar 3a along the rearwardly projecting portion of the shaft 132'. This will cause the lever 4 to actuate the right-hand micro-switch 140, thereby closing the battery circuit from lead 141 (which is connected to the battery lead 30) through to right-hand motor lead 142. The motor 130 is a reversible motor adapted to rotate in the direction indicated by the arrow 130a when energized through line 142. The motor 130 being thus energized, the main drive shaft 132 is thus rotated in the direction indicated by the arrow 132a. The motion of the drive shaft 132 is communicated to the control unit shaft 132' through the gears 133, 134 and 131, which rotates the enclosed differential pawl group 105, 106 and 107 in an attempt to "catch up" with the differential cam group 108, 109. When the reference drive shaft 38 has been rotated to a position such as to cause the transmitter unit (Fig. 1) to show registration between the pointers 88 and 95, the pinion 84 will no longer rotate, which holds the hub portion 110 of the control unit 1a in fixed position. Further rotation of the shaft 132' will thus bring the pawl and cam mechanism of the control unit 1a into alinement corresponding to that shown in Fig. 8, at which time the collar 3a will be moved to neutral position, interrupting the circuit at 140 and deenergizing the motor 130. The resultant operation of the operated device which is connected to shaft 132 is thus indicated by the position of the pointers 88 and 95 which are in view of the operator.

It will be appreciated that owing to the load imposed on the shaft 132 this shaft may on occasion tend to lag materially behind the movement of the reference mechanism of the power unit, causing the gear 139 and the associated cams 108 and 109 of control unit 1a to be rotated materially beyond the position of the differential pawl member 105 which is mechanically interconnected with the shaft 132. For this reason I preferably incorporate an additional control in the unit 1a which is adapted to interrupt the operation of the power reference unit in the event that an excessive lag is attained. For this purpose I provide a push member 145 located in the bottom of the slot 121 in the shaft 132' which is provided with a lug 146 at its inner end mating with a V notch 147 provided in the rearward face of the cam construction 108—109, said V notch 147 and lug 146 cooperating to force the push rod 145 rearwardly (as shown in dot-dash lines in Fig. 13) upon relative rotation of the gear 139 with respect to shaft 132' which is in excess of an amount corresponding to a lead of, for example, three increments of motion of the shaft 38. The push rod 145 may terminate in a knob or button 148 which may be caused to engage the operating arm 149 of a micro-switch 150 which is placed in the common return line 72 which connects the left- and right-reference electromagnets 73 and 33 with the contact T59c of the switching mechanism 58, as through branch leads 72a and 72b. The micro-switch 150 may be termed a "blocking" switch which when open will prevent completion of the return circuit for the left- and right-reference electromagnets 73 and 33 in the event the shaft 132' lags behind the gear 139 more than three increments of motion of the shaft 38. The motor 130 will continue to operate and as soon as the gear 131 has been rotated sufficiently to allow the lug 146 to return to its normal position at the bottom of the notch 147 the power unit will again act to rotate the gear 139 and prevent alinement of the differential pawl and cam mechanism until the complete movement called for by the setting of the knob 2 is effected.

This "blocking" switch and mechanism is useful to interrupt the operation of the indicator or pointer 88, so that no matter how slowly the motor 130 actually operates the shaft 132, the indicator 88 will "follow" this movement and not be out of synchronism therewith more than the predetermined amount, say three increments of movement of the shaft 38. Furthermore, in case of a failure of the motor 130, or a complete jamming of the member operated thereby, the position of the pointer 88 will indicate (within three increments, for example) the position of the operated member at the moment of failure, so that the operator is apprized of the degree of movement which actually has been accomplished.

The operation of the device in a left-hand control action will be apparent from the drawings, the resultant movement of the collar 3a being such as to close the left-hand micro-switch 151 and thereby energize the line 152 which is connected with the motor 130, to cause such motor to rotate in a direction opposite that indicated in the drawings.

It will be appreciated that the specific structure employed to advance the shafts 37 and 38 in order to effect operation of the switching mechanism 57 and 58 is subject to material modification without departing from the broad concept of my invention. For example, in place of the ratchet and pawl reference-advancing mechanism specifically illustrated herein, I may employ a mechanism comparable to that shown in my issued United States Patent No. 2,235,379, with full equivalence, as will be apparent to one skilled in the art.

I claim:

1. A remote-operating structure, which comprises: a control device; a transmitting device having a first switch-operating member adapted for incremental movement; a power device at a position removed from said control device and having a second switch-operating member adapted for incremental movement; electrical circuit means electrically associating said three named devices; first operating means associated with said transmitting device and adapted to effect incremental movement of said first switch-operating member; and second operating means associated with said power device and adapted to effect incremental movement of said second switch-operating member, said transmitting device being provided with a switching mechanism associated with said circuit means and operated by said first switch-operating member to control the initiation of the operation of said second operating means and the termination of the operation of said first operating means, and said power device being provided with a switching mechanism associated with said circuit means and operated by said second switch-operating member to control the initiation of the operation of said first operating means and the termination of the operation of said second operating means.

2. A remote-operating control structure as set forth in claim 1, said control device comprising: two mechanically associated relatively movable members, one of said movable members being provided with a manually operable element under the control of the operator of said structure and being adapted for movement to and between a plurality of positions, and the other of said movable members being mechanically associated with said first switch-operating member and constrained to move therewith between positions alined respectively with said positions of said one movable member; actuating means associated with said two movable members, said actuating means being adapted to be moved to an "off" position when said movable members are alined with respect to each other and being adapted to be moved from said "off" position to an "on" position when said movable members are out of alinement with one another; and switch means associated with said actuating means and forming a part of said electrical circuit means, said switch means being adapted to cause energization of said first and second operating means under the control of said switching mechanisms when said actuating means is in said "on" position and to cause cessation of such energization upon movement of said actuating means to said "off" position.

3. A remote-operating control structure which comprises: a control device; a transmitting device comprising a first switch-operating member adapted for incremental movement and first electro-responsive means adapted to effect such incremental movement; a power device at a position removed from said control device and comprising a second switch-operating member adapted for incremental movement and second electro-responsive means adapted to effect such incremental movement; a switch mechanism operatively associated with said first and second switch-operating members for operation thereby; electrical circuit means connected to said control device, said electro-responsive means and said switch mechanism, said switch mechanism being operable upon movement of said first switch-operating member to complete a circuit through said control device and said second electro-responsive means and open the circuit through said first electro-responsive means, and being operable upon movement of said second switch-operating member to complete a circuit through said control device and said first electro-responsive means and open the circuit through said second electro-responsive means.

4. A remote-operating control structure as set forth in claim 3, said control device comprising: two mechanically associated movable members mounted for coaxial rotation, one of said movable members being provided with a manually operable element under the control of the operator of said structure and being adapted for movement to and between a plurality of positions, and the other of said movable members being mechanically associated with said first switch-operating member and constrained to move therewith between positions alined respectively with said positions of said one movable member; actuating means associated with said two movable members, said actuating means being adapted to be moved to an "on" position upon rotation of said manually operable element to cause said one movable member to move out of alinement with said other movable member and being adapted to be moved from said "on" position to an "off" position when said other movable member is moved into alinement with said one movable member; and switching means associated with said actuating means and forming a part of said electrical circuit means, said switching means being adapted to cause energization of said first and second electro-responsive means under the control of said switching mechanism when said actuating means is in said "on" position and to cause cessation of such energization upon movement of said actuating means to said "off" position.

5. A remote-operating control structure which comprises: a control device; a transmitting device comprising a rotatably mounted switch-operating member adapted for incremental rotational movement, and a first electro-responsive means adapted to effect such incremental movement; a power device at a position removed from said control device and comprising a second rotatably mounted switch-operating member adapted for incremental rotational movement and second electro-responsive means adapted to effect such incremental movement; switching means operatively associated with said first and second switch-operating members for operation thereby; electrical circuit means connected to said control device, said electro-responsive means and said switching means, said switching means being operable upon rotation of said first switch-operating member through one increment to complete a circuit through said control device and said second electro-responsive means and open the circuit through said first electro-responsive means, and being operable upon rotation of said second switch-operating member through one increment to complete a circuit through said control device and said first electro-responsive means and open the circuit through said second electro-responsive means.

6. A remote-operating control structure which comprises: a control device; a transmitting device comprising a rotatably mounted first switch-operating member provided with a switch-operating cam and adapted for incremental rotational movement, and a first electro-responsive member adapted upon energization to effect such incremental movement; a power device at a position removed from said control device and comprising a rotatably mounted second switch-operating member provided with a switch-operating cam and adapted for incremental rotational movement, and a second electro-responsive means adapted to effect such incremental movement; a switching mechanism operatively associated with the cams of said first and second switch-operating members for operation thereby, said switching mechanism comprising a first turn-off portion in the circuit of said first electro-responsive means and a first turn-on portion in the circuit of said second electro-responsive means, both of said portions being associated with said first-named cam, and a second turn-off portion in the circuit of said second electro-responsive means and a second turn-on portion in the circuit of said first electro-responsive means, both of said last-named portions being operatively associated with said second named cam; electrical circuit means connected to said control device, said electro-responsive members and said switch mechanism, said switch mechanism being operable upon one incremental movement of said first switch-operating member to complete a circuit through said control device and said second electro-responsive member and open the circuit through said first electro-responsive member, and being operable upon movement of said second switch-operating member through one increment of movement imparted by the completion of the circuit through said second electro-responsive member to open the circuit through said second electro-responsive member and complete a circuit through said control device and said first electro-responsive member.

7. In a remote-operating control structure provided with a main electrical circuit, a transmitting device and a power device adapted to produce a given movement in an operated member located at a position removed from said transmitting device, a control device for said transmitting and power devices which comprises: two mechanically associated relatively movable members, one of said movable members being provided with a manually operable element under the control of the operator of said structure and being adapted for movement to and between a plurality of positions, and the other of said movable members being mechanically associated with said transmitting device and adapted to move in response thereto between positions alined respectively with said positions of said one movable member; actuating means associated with said two movable members, said actuating means being adapted to be moved to an "on" position when said one movable member is moved out of alinement with said other member, and being adapted to be moved from said "on" position to an "off" position when said other movable member is moved by said transmitting device into alinement with said one movable member; and switch means associated with said actuating means and forming a part of said main electrical circuit to cause energization of said circuit for operation of said transmitting and power devices when said actuating means is in said "on" position and to cause cessation of such energization upon movement of said actuating means to said "off" position.

8. In a remote-operating control structure provided with a main electrical circuit, a transmitting device and a power device adapted to produce a given movement in an operated member located at a position removed from said transmitting device, a control device for said transmitting and power devices which comprises: two mechanically associated movable members mounted for coaxial rotation, one of said movable members being provided with a manually operable element under the control of the operator of said structure and being adapted for movement to and between a plurality of positions, and the other of said movable members being mechanically associated with said transmitting device and adapted to be rotated in response thereto between positions alined respectively with said positions of said one movable member; pawl means on one of said movable members and cam means on the other of said members, said pawl and cam means constituting a differential actuating means adapted to be positioned in a neutral position when said two movable members are in alinement with one another, and adapted to be positioned in an actuating position when said two members are out of alinement with one another.

9. In a remote-operating control structure provided with a main electrical circuit, a transmitting device and a power device adapted to produce a given movement in an operated member located at a position removed from said transmitting device, a control device for said transmitting and power devices which comprises: two mechanically associated movable members mounted for coaxial rotation, one of said movable members being provided with a manually operable element under the control of the operator of said structure and being adapted for movement to and between a plurality of positions, and the other of said movable members being mechanically associated with said transmitting device and adapted to be rotated in response thereto between positions alined respectively with said positions of said one movable member; a pawl member pivotally mounted on said other movable member for movement about an axis parallel to the axis of rotation of said members; cam means on said one movable member and having a cam portion engaging said pawl member, said pawl and cam members being coactingly shaped in such manner as to establish said pawl member in a neutral position when said two movable members are in alinement with one another and to cause movement of said pawl member out of such neutral position into an actuating position upon relative rotation of said movable members out of alinement with one another; an actuating member mechanically associated with said pawl member; and switch means associated with said actuating member and forming a part of said main electrical circuit to cause energization of said circuit for operation of said transmitting and power devices when said pawl member is in said actuating position and to cause cessation of such energization upon movement of said pawl member to said neutral position.

10. A remote-operating structure, which comprises: a control device; a transmitting device having a first switch-operating member adapted for incremental movement; a power device at a position removed from said control device and having a second switch-operating member adapted for incremental movement; electrical circuit means electrically associating said three named devices; first operating means associated with said transmitting device and adapted to effect incremental movement of said first switch-operating member in one direction; second operating means associated with said transmitting device and adapted to effect incremental movement of said first switch-operating member in the opposite direction; third operating means associated with said power device and adapted to effect incremental movement of said second switch-operating member in one direction; fourth operating means associated with said power device and adapted to effect incremental movement of said second switch-operating member in the opposite direction, said transmitting device being provided with a switching mechanism associated with said circuit means and operated by said first switch-operating member upon movement thereof, in either direction, to control the initiation of the operation of said third and fourth operating means and the termination of the operation of said first and second operating means, and said power device being provided with a switching mechanism associated with said circuit means and operated by said second switch operating member to control the initiation of the operation of said first and second operating means and the termination of the operation of said third and fourth operating means.

11. A remote-operating control structure as set forth in claim 10, said control device comprising: two mechanically associated relatively movable members, one of said movable members being provided with a manually operable element under control of the operator of said structure and being adapted for movement to and between a plurality of positions, and the other of said movable members being mechanically associated with said first switch-operating member and constrained to move therewith between positions alined respectively with said positions of said one movable member; actuating means associated with said two movable members, said actuating means being adapted to be moved to an "off" position when said movable members are alined with respect to each other and being adapted to be moved from said "off" position to a first "on" position when said movable members are out of alinement with one another as a result of movement of said one movable member to one side of said other movable member, and to a second "on" position when said movable members are out of alinement with one another as a result of movement of said one movable member to the opposite side of said other movable member; and switch means associated with said actuating means and forming a part of said electrical circuit means, said switch means being adapted to cause energization of said first and third operating means under the control of said switching mechanisms when said actuating means is in said first "on" position only, and adapted to cause energization of said second and fourth operating means under control of said switching mechanisms when said actuating means is in the second "on" position only, and to cause cessation of such energization upon movement of said actuating means to said "off" position.

12. A remote-operating control structure which comprises: a control device; a transmitting device comprising a first rotatably mounted switch operating member adapted for incremental rotational movement; a first electro-responsive means adapted to effect such incremental movement in a right-hand direction, a second electro-responsive means adapted to effect such incremental movement in a left-hand direction; a power device at a position removed from said control device and comprising a second rotatably mounted switch operating member adapted for incremental rotational movement, a third electro-responsive means adapted to effect such incremental movement in a right-hand direction, and a fourth electro-responsive means adapted to effect such incremental movement in a left-hand direction; switching means operatively associated with said first and second switch-operating members for operation thereby; and electrical circuit means electrically associating said electro-responsive members and said switching means including circuit closing means operated by said control device and adapted, on the one hand, to supply current to said first and third electro-responsive means and, on the other hand, to supply current to said second and fourth electro-responsive means, said switching means being adapted to complete the electrical circuit through said third and fourth electro-responsive means whereby upon operation of said circuit closing means one of said third and fourth electro-responsive means is energized to cause rotation of said second switch-operating member through one increment of movement, and said switching means being adapted upon such movement of said second switch-operating member to complete the circuit through said circuit closing means and one of said first and second electro-responsive means to cause rotation of said first switch-operating member through one increment of movement in the same relative direction as was effected in the second switch-operating member and to open the return circuit of the energized one of said third and fourth electro-responsive means, and said switching means being further adapted upon movement of said first switch-operating member through said one increment of movement to open the return circuits for said first and second electro-responsive means and to reestablish the return circuits for said third and fourth electro-responsive means, whereby a repetition of the successive incremental movements of said switch-operating members is maintained during the supply of current through said circuit closing means.

13. A remote-operating control structure as set forth in claim 12, said control device comprising: two mechanically associated relatively movable members mounted for coaxial rotational movement, one of said movable members being provided with a manually operable element under the control of the operator of said structure and being adapted for movement to and between a plurality of positions, and the other of said movable members being mechanically associated with said first switch-operating member and constrained to move therewith to and between positions alined respectively with said positions of said one movable member; and actuating means associated with said two movable members, said actuating means being adapted to move said circuit closing means to an "off" position when said movable members are alined with respect to each other and being adapted to move said circuit closing means into a position such as to provide current to one side of said first and third electro-responsive means when said movable members are out of alinement with one another as a result of movement of said one movable member to the right-hand side of said other movable member, and to cause said circuit closing means to supply current to one side of said second and fourth electro-responsive means when said movable members are out of alinement with one another as a result of movement of said one movable member to the left side of said other movable member.

14. In a remote-operated control mechanism adapted to effect movement in an operated member located at a position removed from a control point, the combination which comprises: a transmitting member located adjacent such control point and adapted for incremental movement; a power member adjacent such operated member in operative association therewith and adapted for incremental movement; operating means for each of said members to cause alternate incremental movement thereof; and a control device at said control point and provided with a first index member adapted for manual adjustment to any one of a plurality of positions, a second index member operatively associated with said transmitting member and adapted for movement thereby into alinement with said first index member at any one of said plurality of positions; and reference means associated with said transmitting member, said power member, said operating means and said control device, said reference means being adapted (1) to cause a single incremental movement of said power member in one direction upon movement of said first index member to one side of said second index member and to cause a single incremental movement of said power member in the opposite direction upon movement of said first index member to the opposite side of said second index member, (2) to cause an incremental movement of said transmitting member in response to the completion of an incremental movement of said power member and in the same direction of movement as that completed in said power member and thus effect movement of said second index member towards a position of alinement with said first index member, and (3) to cause successive alternate incremental movement of said power and transmitting members as set forth under (1) and (2) hereinabove until said second index member is brought into alinement with said first index member.

15. A remote-operating control structure which comprises: a control device; a transmitting device having a first switch-operating member adapted for incremental movement; first electro-responsive means for effecting incremental movement of said first switch-operating member in one direction; second electro-responsive means for effecting incremental movement of said first switch-operating member in the opposite direction; a power device operatively associated with the operated member in which a desired remote-control movement is to be effected, said power device having a second switch-operating member adapted for incremental movement; third electro-responsive means for effecting incremental movement of said second switch-operating member in one direction; fourth electro-responsive means for effecting incremental movement of said second switch-operating member in the opposite direction; switching means operatively associated with said first and second switch-operating members for operation thereby; and electrical circuit means electrically associating said electro-responsive members and said switching means and including circuit-closing means operated by said control device and adapted, on the one hand, to be moved by said control device into a first position causing energization of a first relay means and thereby to supply current to said first and third electro-responsive means while withholding supply of current to said second and fourth electro-responsive means, and on the other hand, to be moved by said control device into a second position causing energization of a second relay means and thereby to supply current to said second and fourth electro-responsive means while withholding supply of current to said first and third electro-responsive means, and said switching means being adapted to complete the electrical circuit through said third and fourth electro-responsive means, while holding open the circuit through said first and second electro-responsive means, whereby upon operation of said circuit-closing means one of said third and fourth electro-responsive means is energized to cause movement of said second switch-operating member through only one increment in a given direction dependent upon the position of said circuit-closing means, and said switching means being adapted upon such one increment of movement of said second switch-operating member to complete the electrical circuit through the one of said first and second electro-responsive means adapted to cause one increment of movement of said first switch operating member in the same relative direction as was effected in said second switch-operating member and to open the return circuit of the energized one of said third and fourth electro-responsive means, and said switching means being further adapted upon movement of said first switch-operating member through said one increment of movement to open the return circuits for said first and second electro-responsive means and to reestablish the return circuits for said third and fourth electro-responsive means, whereby a repetition of the successive incremental movements of said switch-operating members is maintained during the supply of current through said circuit closing means.

16. A remote-operating control structure as set forth in claim 15, said first and second relay means being electrically interlocked whereby upon energization of one of said relay means the energization circuit of the other of said relay means is held open, and each of said relay means being of the delayed-opening type whereby upon deenergization of one of said relay means through movement of said circuit-closing means out of either of said first and second positions the energization circuit of the other relay means is held open for a predetermined given time period following such circuit-closing means movement, such given time period being not less than substantially equal to the sum of the operating times of one increment of movement of said first and second switch-operating members.

17. In a remote-operating control device adapted to effect a substantially smooth power-flow movement in an operated member, the combination which comprises: a drive member for said operated member; a power device adapted for incremental movement; operating means associated with said power device and adapted to effect incremental movement thereof; and a control device adapted to cause operation of said drive member in response to movement of said power device, said control device comprising (a) two mechanically associated relatively movable members adapted for alinement with one another, one of said movable members being mechanically associated with said operated member and movable therewith, the other of said movable members being mechanically associated with said power device and movable therewith, and (b) actuating means associated with said two movable members, said actuating means being adapted to be moved to an "on" position to cause operation of said drive member when said two movable members are out of alinement with one another and being adapted to be moved to an "off" position when said two movable members are alined with one another.

18. In a remote-operating control device adapted to effect a substantially smooth power-flow movement in an operated member, the combination which comprises: a drive member for said operated member including a reversible motor means provided with reversing switch means; a power device adapted for rotative incremental movement and including operating means for effecting such incremental movement in either direction; and a control device having two mechanically associated movable members mounted for coaxial rotation, one of said movable members being mechanically associated with said drive member for rotation thereby and the other being mechanically associated with said power device for rotation thereby; said control device being also provided with switch-actuating means mechanically associated with both of said movable members and with said reversing switch means and adapted (a) to cause said reversing switch means to hold open the circuit to said motor means when said movable members are in a position of relative alinement, (b) to cause said reversing switch means to connect said motor means for operation in a direction such as to rotate said one movable member in one direction when said other movable member is rotated in said one direction, and (c) to cause said reversing switch means to connect said motor means for operation in a direction such as to rotate said one movable member in the other direction when said other movable member is rotated in said other direction.

19. The construction set forth in claim 18, said control device further comprising a second actuating member associated with both of said movable members and with said operating means, said second actuating means being adapted to prevent operation of said operating means when said two movable members are out of alinement with one another more than a predetermined amount.

20. In a remote-operated control device adapted to effect a substantially smooth power-flow movement in an operated member, the combination which comprises: a control device having two mechanically associated movable members mounted for coaxial rotation and normally disposed in an alined relation; motor means adapted for rotation in either direction and operatively associated with such operated member; gear means constraining one of said movable members to rotation with said motor means; a rotatable member adapted for incremental rotational movement; gear means constraining the other of said movable members to rotation with said rotatable member; operating means for imparting incremental rotation to said rotatable member; reversing switch means adapted to control said motor means and having a first position in which said motor means is unenergized, a second position in which said motor means is caused to rotate in a direction such as to cause said one movable member to rotate in one direction, and a third position in which said motor means is caused to rotate in a direction such as to rotate said one movable member in the other direction; and actuating means associated with said movable members and said reversing switch means, said actuating means being adapted to place said reversing switch means in said first position when said movable members are in alinement, to place said reversing switch means in said second position when said other movable member is rotated in said one direction, and to place said reversing switch means in said third position when said other movable member is rotated in said other direction.

21. The construction set forth in claim 20, and comprising in addition a second actuating means associated with both of said movable members and with said operating means, said second actuating means being adapted to prevent operation of said operating means when said two movable members are out of alinement with one another more than a predetermined amount.

DELOS E. MARSH.